(12) United States Patent
Craske et al.

(10) Patent No.: US 12,259,821 B2
(45) Date of Patent: Mar. 25, 2025

(54) LOOKUP CIRCUITRY FOR SECURE AND NON-SECURE STORAGE

(71) Applicant: ARM LIMITED, Cambridge (GB)

(72) Inventors: Simon John Craske, Cambridge (GB); Jacob Eapen, Cambridge (GB)

(73) Assignee: Arm Limited, Cambridge (GB)

( * ) Notice: Subject to any disclaimer, the term of this patent is extended or adjusted under 35 U.S.C. 154(b) by 193 days.

(21) Appl. No.: 17/310,368

(22) PCT Filed: Jan. 29, 2020

(86) PCT No.: PCT/GB2020/050206
§ 371 (c)(1),
(2) Date: Jul. 29, 2021

(87) PCT Pub. No.: WO2020/157496
PCT Pub. Date: Aug. 6, 2020

(65) Prior Publication Data
US 2022/0100673 A1    Mar. 31, 2022

(30) Foreign Application Priority Data

Feb. 1, 2019 (GB) .................................. 1901436

(51) Int. Cl.
*G06F 12/10* (2016.01)
*G06F 12/14* (2006.01)

(52) U.S. Cl.
CPC .......... *G06F 12/10* (2013.01); *G06F 12/1416* (2013.01); *G06F 2212/1052* (2013.01)

(58) Field of Classification Search
CPC .... G06F 12/10; G06F 12/1416; G06F 21/572; G06F 21/57; G06F 3/0679
(Continued)

(56) References Cited

U.S. PATENT DOCUMENTS 7,216,362 B1 *  5/2007  Strongin ............. G06F 12/1458
                                                                726/16
7,228,400 B2 *  6/2007  Sheriff .................... G06F 21/52
                                                                713/194

(Continued)

FOREIGN PATENT DOCUMENTS

CN         1711525         12/2005
CN       101520753          9/2009
(Continued)

OTHER PUBLICATIONS

Office Action for IN Application No. 202117034247 dated Feb. 14, 2023, 6 pages.
(Continued)

*Primary Examiner* — Yaima Rigol
*Assistant Examiner* — Edward Waddy, Jr.
(74) *Attorney, Agent, or Firm* — NIXON & VANDERHYE P.C.

(57) ABSTRACT

There is provided an apparatus comprising input circuitry that receives requests comprising input addresses in an input domain. Output circuitry provides output addresses. The output addresses comprise secure physical addresses to secure storage circuitry and non-secure physical addresses to non-secure storage circuitry. Lookup circuitry stores a plurality of mappings comprising at least one mapping between the input addresses and the secure physical addresses, and at least one mapping between the input addresses and the non-secure physical addresses.

16 Claims, 5 Drawing Sheets

| Error action | Possible values | Length (bits) |
|---|---|---|
| NS check | 0,1 | 1 |
| Fault type | invalid_page, security_mismatch | 1 |
| Direction | none, least, most | 2 |
|  |  |  |

(58) Field of Classification Search
USPC ................................. 711/202, 152, E12.001
See application file for complete search history.

(56) References Cited

U.S. PATENT DOCUMENTS

| | | |
|---|---|---|
| 2004/0143714 A1 | 7/2004 | Watt |
| 2014/0181359 A1* | 6/2014 | Zhang .................... G06F 12/08 |
| | | 711/6 |
| 2015/0277763 A1* | 10/2015 | Zhou ................... G06F 12/0238 |
| | | 711/105 |
| 2016/0034216 A1 | 2/2016 | Chun et al. |
| 2016/0140073 A1 | 5/2016 | Sanzone et al. |
| 2016/0197722 A1 | 7/2016 | Mothilal |
| 2016/0364338 A1 | 12/2016 | Zmudzinski et al. |
| 2017/0097896 A1 | 4/2017 | Molnar et al. |
| 2017/0139844 A1* | 5/2017 | Zavalney ............ G06F 12/1483 |
| 2017/0185539 A1 | 6/2017 | Xu et al. |
| 2017/0249260 A1 | 8/2017 | Sahita et al. |
| 2019/0171585 A1* | 6/2019 | Yonemura ............... G06F 21/78 |

FOREIGN PATENT DOCUMENTS

| | | |
|---|---|---|
| JP | 2006-506751 | 2/2006 |
| JP | 2009-211698 | 9/2009 |
| JP | 2017-4522 | 1/2017 |
| TW | I486760 | 6/2015 |
| TW | I488041 | 6/2015 |
| TW | I525431 | 3/2016 |

OTHER PUBLICATIONS

Office Action for TW Application No. 109102109 issued Dec. 25, 2023 and English translation, 12 pages.

Office Action for JP Application No. 2021-544603 issued Jan. 26, 2024 and English translation, 8 pages.

Office Action for EP Application No. 20703813.4 dated Mar. 15, 2024, 5 pages.

Office Action for CN Application No. 202080012264.2 issued Sep. 28, 2024 and English translation, 33 pages.

\* cited by examiner

| Error action | Possible values | Length (bits) |
|---|---|---|
| NS check | 0,1 | 1 |
| Fault type | invalid_page, security_mismatch | 1 |
| Direction | none, least, most | 2 |

FIG. 3

LOOKUP CIRCUITRY FOR SECURE AND NON-SECURE STORAGE

The present disclosure relates to data processing. More particularly it relates to data storage.

Within some systems, it could be desirable to operate in a number of different modes with memory allocated to each mode. For example, software that executes in a first mode of operation could be restricted to accessing regions of memory associated with the first mode of operation. Meanwhile, software that executes in the second mode of operation could be permitted to access both regions of memory associated with the first mode of operation as well as regions of memory associated with the second mode of operation. The first and second modes of operation could, for example, be a non-secure mode of operation and a secure mode of operation, respectively.

In at least one example embodiment there is an apparatus comprising: input circuitry to receive requests comprising input addresses in an input domain; output circuitry to provide output addresses, wherein the output addresses comprise secure physical addresses to secure storage circuitry and non-secure physical addresses to non-secure storage circuitry; and lookup circuitry to store a plurality of entries that indicate, for each of the input addresses, a corresponding one of the output addresses, wherein at least one of the entries relates to one of the secure physical addresses, and at least one of the entries relates to one of the non-secure physical addresses.

In at least one example embodiment there is a method comprising: receiving requests comprising input addresses in an input domain; providing output addresses, wherein the output addresses comprise secure physical addresses to secure storage circuitry and non-secure physical addresses to non-secure storage circuitry; and storing a plurality of entries that indicate, for each of the input addresses, a corresponding one of the output addresses, wherein at least one of the entries relates to one of the secure physical addresses, and at least one of the entries relates to one of the non-secure physical addresses.

In at least one example embodiment there is an apparatus comprising: means for receiving requests comprising input addresses in an input domain; means for providing output addresses, wherein the output addresses comprise secure physical addresses to secure storage circuitry and non-secure physical addresses to non-secure storage circuitry; and means for storing a plurality of entries that indicate, for each of the input addresses, a corresponding one of the output addresses, wherein at least one of the entries relates to one of the secure physical addresses, and at least one of the entries relates to one of the non-secure physical addresses.

The present techniques will be described further, by way of example only, with reference to embodiments thereof as illustrated in the accompanying drawings, in which:

FIG. 3 illustrates a number of examples of possible settings that can be set in configuration registers in accordance with some embodiments;

Figure 1:
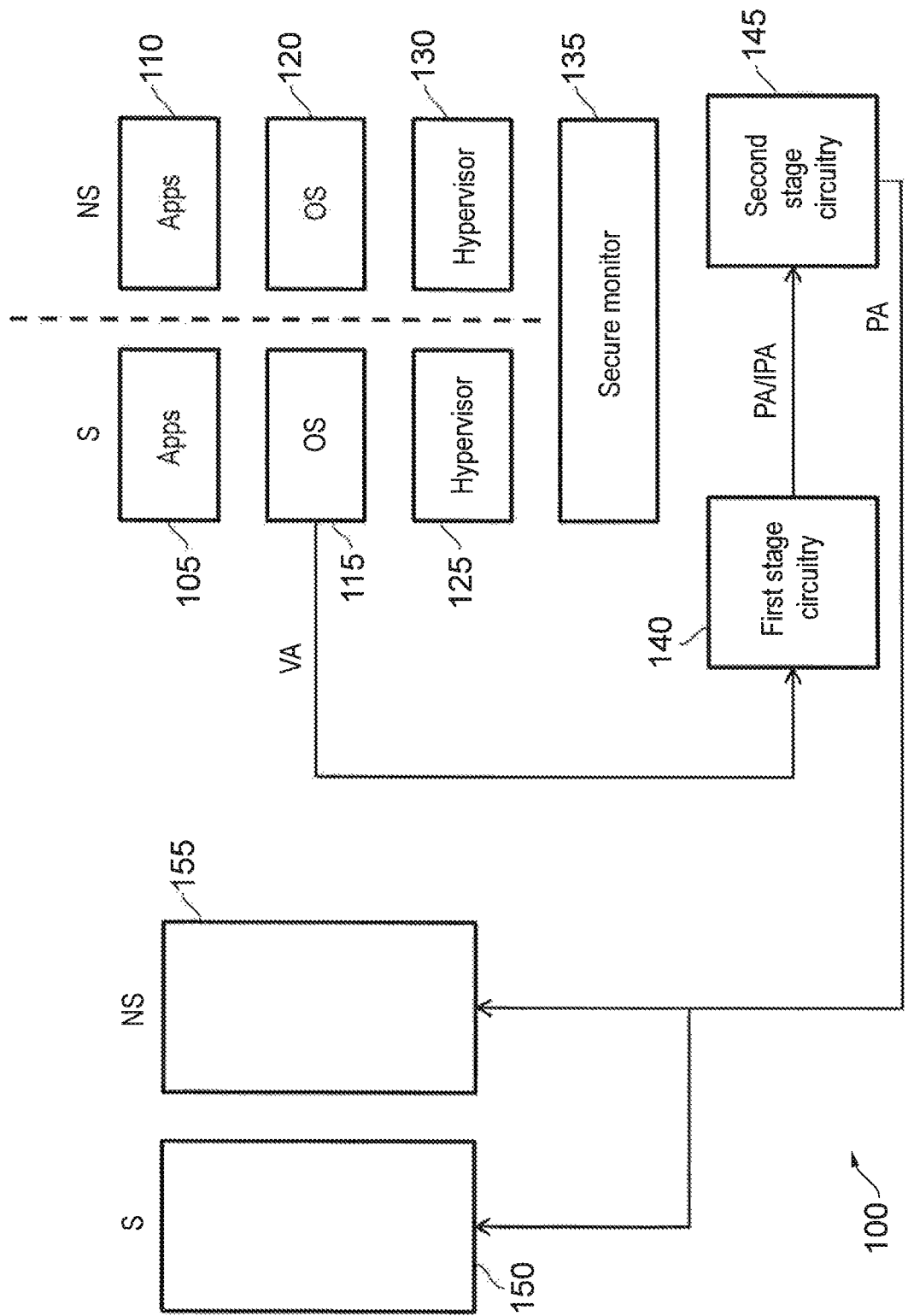
FIG. 1 illustrates a system in accordance with some embodiments.

Before discussing the embodiments with reference to the accompanying figures, the following description of embodiments and associated advantages is provided.

At least some embodiments provide an apparatus comprising: input circuitry to receive requests comprising input addresses in an input domain; output circuitry to provide output addresses, wherein the output addresses comprise secure physical addresses to secure storage circuitry and non-secure physical addresses to non-secure storage circuitry; and lookup circuitry to store a plurality of entries that indicate, for each of the input addresses, a corresponding one of the output addresses, wherein at least one of the entries relates to one of the secure physical addresses, and at least one of the entries relates to one of the non-secure physical addresses.

In the above embodiments, access requests (e.g. read or write) are received by the apparatus to access storage circuitry. The storage circuitry is separated into secure storage circuitry that stores data for software executing in a secure mode of operation, and non-secure storage circuitry that stores data for software executing in a non-secure mode of operation. In some embodiments, the software that executes in the secure mode of operation is able to access data in either storage circuitry, but the software that executes in the non-secure mode of operation is prohibited from accessing data in the secure storage circuitry (e.g. it can access the non-secure storage circuitry, but not the secure storage circuitry). The output addresses are physical addresses and so correspond to an address of a specific location in either the secure storage circuitry or the non-secure storage circuitry, the input addresses are within an input domain. The input domain could itself by the domain of the physical addresses if, for instance, a change in address need not take place. Note, however, that the term "translation" is still used, even though there is no change between the input address and the output address in such circumstances. The domain could also be a virtual domain (or partial physical domain) in which the physical address differs from the input address. The lookup circuitry can be used to indicate the corresponding output address for an input address. In some cases, both the input address and the output address could be the same. Regardless, the lookup circuitry contains entries for both secure addresses and non-secure addresses.

In some embodiments, the apparatus is a Memory Protection Unit. A Memory Protection Unit (MPU) provides protection capabilities to the storage circuitry thereby preventing a process from accessing memory that it is not permitted to access. This can take place by defining a number of memory regions, each of which can be associated with particular access attributes and each of which can be indicated as belonging to the secure storage circuitry or the non-secure storage circuitry. In some of these embodiments, the translation process performed by the MPU does not change the input address (and so the input addresses and the output addresses are the same)—rather than change the address, the request is directed towards the appropriate storage circuitry.

In some embodiments, the input address is an Intermediate Physical Address; and the entries comprise mappings from the input addresses to the secure physical addresses and from the input addresses to the non-secure physical addresses. This can be used in multi-stage translation in which, in a first stage, a Virtual Address (VA) is translated to an Intermediate Physical Address (IPA) and then, in a second stage, the apparatus is used to translate the IPA into a Physical Address (PA). Again, note that the VA and IPA, or the IPA and PA, or even if the VA, IPA, and PA could all be the same. One situation that the use of an IPA could arise is when a hypervisor is provided. Being unaware of the hypervisor, an operating system might assume that a particular address is a physical address, since the operating system might see an abstracted view of the system that has been provided by the hypervisor. In practice, however, a second level of translation might be required to convert this (intermediate physical) address into a real physical address.

In some embodiments, the lookup circuitry comprises, for each entry in the entries, a security indicator to indicate whether the entry is a secure physical addresses or whether the entry is a non-secure physical addresses. The security indicator could, for example, take the form of a single bit in the lookup circuitry to indicate whether the entry relates to a non-secure address or a secure address.

In some embodiments, the apparatus comprises protection circuitry to control access to the secure storage circuitry and the non-secure storage circuitry in dependence on the security indicator. Based on this indicator, it is possible for the lookup circuitry to determine from where the data should be retrieved. In particular, if the entry indicates that the address is a secure physical address then the data should be retrieved from the secure storage circuitry whereas if the address is a non-secure physical address then the data should be retrieved from the non-secure storage circuitry.

In some embodiments, each request in the requests comprises a request type field to indicate whether an input address in that request is associated with one of the secure physical addresses or one of the non-secure physical addresses. The request type field therefore indicates whether the issuer of the request (e.g. the operating system) believes the request to relate to an address in secure storage or non-secure storage.

In some embodiments, the protection circuitry is adapted to control access to the secure storage circuitry and the non-secure storage circuitry in dependence on the security indicator and the request type field. The security indicator and the request type field could differ from each other. For instance, the request type field could indicate that the request is being made in respect of non-secure storage while the data is actually stored in secure storage. Data could be stored in an "unexpected" location, for instance, in order to enable communication between processes. For this, both processes would operate in the same domain (e.g. secure or non-secure) since cross-domain communication could be prohibited for security purposes.

In some embodiments, when the request type field and the security indicator correspond, the protection circuitry permits the request to proceed. In these embodiments, when the indications provided by the security indicator and the request type field both indicate that a same domain is used (e.g. when they match), the request is permitted to proceed. No further action needs to be taken, since the domain indicated by the request type field matches that of the security indicator and hence the data is stored in the domain that is expected.

For instance, in some embodiments, when the request type field indicates the input address is associated with the non-secure storage circuitry and the security indicator indicates the input address is associated with the non-secure storage circuitry, the protection circuitry forwards the request to the non-secure storage circuitry. Similarly, in some embodiments when the request type field indicates the input address is associated with the secure storage circuitry and the security indicator indicates the input address is associated with the secure storage circuitry, the protection circuitry forwards the request to the secure storage circuitry.

In some embodiments, the apparatus comprises storage circuitry to store one or more settings to perform one or more error actions to control behaviour of the protection circuitry when there is a mismatch between the request type field and the security indicator. The storage circuitry could, for, instance, take the form of a flop that indicates whether a particular action is or is not to take place in the event of a mismatch. The flop could, for example, store a single bit of a register with other bits indicating whether other actions are to be performed instead, or to indicate which of several actions is to be performed.

In some embodiments, when the request type field indicates the input address is associated with the secure storage circuitry and the security indicator indicates the input address is associated with the non-secure storage circuitry, the protection circuitry performs the error actions; and when the request type field indicates the input address is associated with the non-secure storage circuitry and the security indicator indicates the input address is associated with the secure storage circuitry, the protection circuitry performs the error actions. The error actions are therefore performed in response to a mismatch between the security indicator and the request type field.

There are a number of possibilities for the error actions, each of which can be used in isolation or in any combination.

In some embodiments, the error actions comprise forwarding the request to the least secure of the storage circuitries indicated by the request type field and the security indicator. This could, for example, be a least privileged of the storage circuitries and/or could be the circuitry having the least protection associated with it. Where the storage circuitries define domains of "secure" and "non-secure", this will be the non-secure domain. By directing the request to the least secure of the storage circuits, it is less likely that security will be breached.

Alternatively, in some embodiments, the error actions comprise forwarding the request to the most secure of the storage circuitries indicated by the request type field and the security indicator.

In some embodiments, the error actions comprise generating a fault. For example, in some embodiments, the fault corresponds with an invalid page fault. In this way, existing techniques for handling a memory access error can be employed, such as the operating system or hypervisor responding to the fault by suspending or ending executing of the software that made the invalid access request. The operating system or hypervisor could also perform different behaviour depending on the nature or permissions of the software that made the request.

In some embodiments, the request comprises an override field to indicate whether the protection circuitry should be overridden.

In some embodiments, the override field is adapted to indicate whether the request should be forwarded to the secure storage circuitry or the non-secure circuitry, irrespective of the security indicator. In this way, regardless of the typical behaviour of the protection circuitry, it may be possible to cause the request to proceed and/or to be directed towards particular storage circuitry regardless of the underlying protection mechanism.

Some particular embodiments are now described with reference to the figures.

FIG. 1 illustrates a system 100 in which software is executed at a number of different privilege modes and execution levels. In particular, the system 100 includes a secure domain (S) and a non-secure domain (NS). Applications that operate in the secure domain are able to access data that is reserved for the secure domain and the non-secure domain. However, software that executes in the non-secure domain is only able to access memory that is reserved for the non-secure domain and cannot access memory reserved for the secure domain. The apparatus can, at any one time, therefore execute in a secure mode of operation where software in the secure domain is active, or in a non-secure mode of operation where software in the non-secure domain is active.

Aside from these execution modes, a number of different execution levels exist—one for each of the execution modes. There is a lowest application level 105, 110, an operating system level 115, 120 and a hypervisor level 125, 130. Above this is a secure monitor level 135, which spans both the secure domain and the non-secure domain.

Applications execute at the lowest privilege level 105, 110 and are managed by operating systems. The operating systems execute at the operating system level 115, 120, and are in turn managed by hypervisors. The hypervisors execute at a hypervisor level 125, 130, which in turn are managed by the secure monitor, which is responsible for switching between the secure mode of operation and the non-secure mode of operation Due to the division between the execution modes, operating systems that operate in their non-secure domain 120 are only able to manage applications that operate in their non-secure domain 110 and are unable to manage applications that operate in their secure domain 105.

The system 100 may use a number of different operating systems. These can, in turn, be managed by hypervisors. Again, a hypervisors are provided for the secure domain 125 that manage operating systems in the secure domain 115 and they are provided for the non-secure domain 130, which manage operating systems within the non-secure domain 120. A secure monitor 135 is provided that operates at highest level of execution.

During execution of one of the applications, an access request may be made to a Virtual Address (VA). The virtual address is issued by the relevant operating system to first stage translation circuitry 140, which could take the form of a Translation Lookaside Buffer (TLB) or an EL0 managed Memory Protection Unit (MPU). A TLB provides a first stage translation from the Virtual Address (VA) to either a Physical Address (PA) or an Intermediate Physical Address (IPA). An Intermediate Physical Address could be used as a consequence of the operating system being given an abstracted view of the system by the appropriate hypervisor 125, 130 in order to enable the execution of a number of different operating systems.

A second stage of the address translation is then performed by second stage translation circuitry 145. Based on the input, this produces a PA. This could involve further translation from, for instance, an IPA, and such a translation could be provided by a TLB for instance. Alternatively, the input and the output could both be PAs and memory protection operations could be performed in order to control access to the appropriate area of memory. Such a service would take the form of a Memory Protection Unit (MPU). In either case, only a single second stage circuit 145 is provided. Consequently, the PA that is output by the second stage circuitry 145 can relate to both secure memory 155, which is provided for the secure domain applications 105, operating systems 115, hypervisor 125 and to non-secure memory 155, which is provided for the non-secure domain applications 110, operating systems 120, and hypervisor 130.

The address that is output by the first stage translation circuitry 140 could be an Intermediate Physical Address or Physical Address. In particular, although a second stage of translation process is carried out, there is no need for this second translation stage to involve a change or conversion of the address. That is to say that there may be no conversion of addresses, or that the conversion is entirely performed by the first stage translation circuitry 140 which outputs a physical address. Further operations can then be performed on this physical address by, for instance, the MPU 145 such as determining whether the physical address is permitted to be accessed or not. In other embodiments, the Intermediate Physical Address that is output by the first stage translation circuitry 140 must be further converted in order to obtain the physical address.

As previously explained, the term "translation" is used here, even when MPUs are used for both stages. The skilled person will appreciate that a "translation" in this context does not necessitate the address being converted. For instance, such a "translation" process could include performing checks, attribute assignment and calculation of a new address with the translation circuitry (e.g. in the form of an MPU) calculating the output address to be the same as the input address. Accordingly, although a change in address could occur after the first stage or after the second stage, there is no obligation for a change in address to occur at any point. Such behaviour would correspond with, for instance, an MMU performing full address translation where the associated page table entry contains an IPA (in the case of first stage translation) with the same value as the associated VA.

Figure 2:
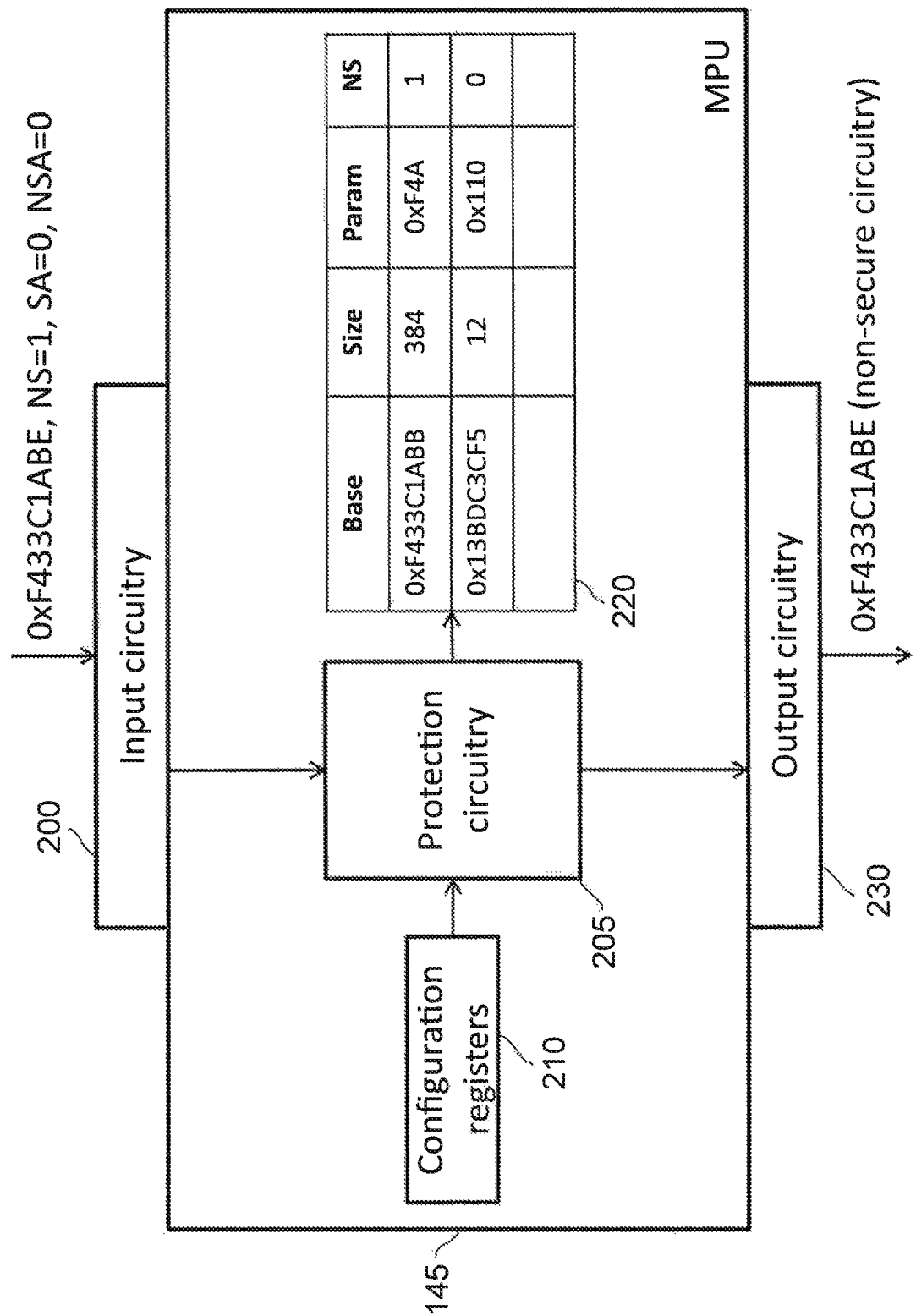
FIG. 2 illustrates an example of the second stage circuitry in accordance with some embodiments.

FIG. 2 illustrates an example of the second stage circuitry 145 in the form of a memory protection unit (MPU). The MPU 145 includes input circuitry 200 that receives a request to access a location and memory. The address that is provided to the input circuitry 200 may be an IPA or a PA as previously discussed. Since the embodiment shown in FIG. 2 is an MPU, the address that is provided to the input circuitry 200 is a PA. The access request that is received by the input circuitry 200 also includes a flag (NS) to indicate whether the access request is secure (0) or non-secure (1). In addition, an override (SA, NSA) is provided that indicates whether the access request is being forced to a particular storage circuit. In this case, the value indicates that no override is being provided since both SA (force secure to non-secure) and NSA (force non-secure to secure) are zero.

The access request is passed to protection circuitry 205 to control access to the secure circuitry 150 and the non-secure circuitry 155. The control is performed on the basis of storage circuitry 220 that contains a number of regions of memory that has been identified together with parameters for those particular regions. In addition, the protection circuitry also references configuration registers 210 that control the behaviour of the protection circuitry 205. Examples of configuration registers 210 are illustrated with respect to FIG. 3. In this example, the input address that is provided (0xF433C1ADE) is located within the region having a base address of 0xF433C1ABB, which has a size of 384 bytes. Note that an MPU is able to define regions of sizes that are not powers of two, thereby providing flexibility in the size of defined regions. Consequently, the access request hits on that region. As shown in FIG. 2, the storage circuitry 220 that defines that region lists the parameters as 0xF4A. The specifics of these parameters are not relevant to the present disclosure. However such parameters could be used to further control access to the memory region by, for instance, limiting whether different processes can read, or write to the memory region in question. Regardless, a flag 'NS' is provided as a security indicator to indicate whether the memory region is associated with the secure storage circuitry 150 or non-secure storage circuitry 155. In this case, the value on the region of the storage circuitry 220 that has been hit has a value of '1' for the flag 'NS'. Consequently, the memory region is associated with non-secure storage circuitry 155. The protection circuitry notes that the security indicator matches the request type field 'NS' and therefore the request is permitted to proceed. Accordingly, the output address, which in this case matches the input address, is output by the output circuitry 230 to the non-secure storage circuitry 155. The behaviour of the protection circuitry in respect of the configuration register 210, the request type field 'NS', the override fields SA' and 'NSA' and the security indicator 'NS' is illustrated in more detail with respect to FIG. 4.

Accordingly, it will be appreciated that the second stage circuitry 145 is able to provide a single storage circuit 220 that provides access to both secure storage circuitry 150 and non-secure storage circuitry 155. Accordingly, only a single MPU 145 needs be provided in order to control access to both the secure storage circuitry 150 and the non-secure circuitry 155.

FIG. 3 illustrates a number of examples of possible settings that can be stored in configuration registers 210 that may be used in order to control the behaviour of the protection circuitry 205. In particular, the configuration registers 210 can be used in order to control the number of error actions that occur when there is a mismatch between the request type field 'NS' and the security indicator 'NS'. In this example, the error actions indicate whether a fault should be raised, the type of fault that should be raised, and how the request should be directed in the event of a mismatch. The "raised fault" error action has two possible values. Either a fault is raised or it is not. Accordingly, this can be represented by a single bit. The "fault type" indicates the type of fault that should be raised in the event that a fault is raised. In this example, this can include an invalid_page fault, which previously proposed systems use in order to indicate that a requested page is not valid, or a "security-_mismatch" fault, which is used to indicate a mismatch between the request type field and the security indicator. Again, since this configuration value has only two options, it can be represented using a single bit. Clearly in the event that no fault is raised as defined by the "raised fault" configuration value, the "fault type" configuration value is disregarded. The "direction" error action indicates the direction to which the request should be directed. Here, there are three permitted values. If the direction is indicated as being "none" then the request is not forwarded. If the direction is indicated as being "leased" then the request is forwarded to the least secure of the storage circuits, which in this example would be the non-secure storage circuit 155. Alternatively, if the direction is indicated as being the most secure, then the request is directed to the most secure of the storage circuits which in this case would be the secure storage circuitry 150. These three values can be represented in two bits. Accordingly, a total of four bits can be used in order to indicate whether a fault should be raised, the type of fault that should be raised, and what should be done with the request in the event of a mismatch. Other possible error actions will be clear to the skilled person.

Figure 4:
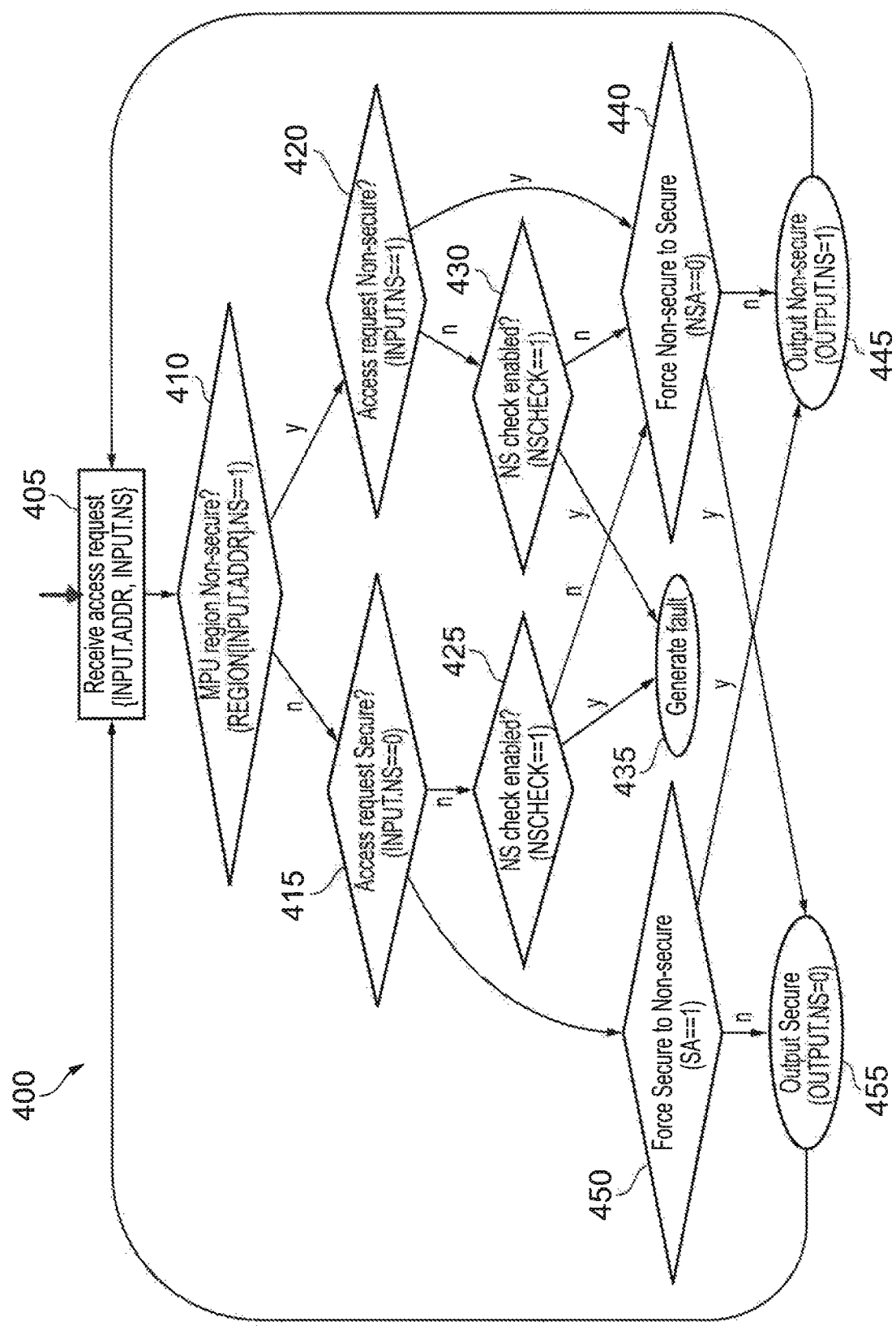
FIG. 4 illustrates a flow chart that shows the decision process in accordance with some embodiments.

FIG. 4 illustrates a flow chart 400 that shows a decision process that may be performed by the protection circuitry 205 when determining whether a memory region that is hit in the storage circuitry 220 should be accessed. At a step 405, the access request is received. The access request includes an address (INPUT.ADDR) and an indication (INPUT.NS) of whether the access request is secure (0) or non-secure (1). At a step 410, it is then determined whether the region of memory is secure, i.e. whether REGION [INPUT.ADDR].NS is 1. If not, then at step 415, it is determined whether the access request is secure. If so, then at step 450 it has been determined that the memory region is secure and the access request is secure. Step 450 then determines whether the request should be forced to be non-secure (i.e. whether the SA flag is 1). If not, then at step 455, the request proceeds as secure (OUTPUT.NS=0). If so, then at step 445, the request proceeds as non-secure (OUTPUT.NS=1). Returning to step 415, if the access request is not secure then at step 425 it has been determined that the memory region is secure but the access request is non-secure. Step 425 then determines whether NSCHECK is set. This causes a fault to be raised in the event of a mismatch between the memory region security and the request security (which is the case at step 425). Hence, if NSCHECK is set then at step 435, a fault is generated. The type of fault can be specified by the configuration value 'Fault type' shown in FIG. 3. Otherwise, at step 440, the transaction defaults to the least secure mode (i.e. non-secure). However, step 440 allows this to be override or forced. In particular at step 440, it is determined whether NSA is set, to force a non-secure transaction to a secure transaction. If not, then at step 445, the transaction is output as non-secure (OUTPUT.NS=1). If so, then at step 455, the transaction is output as secure as previously discussed.

Returning to step 410, if the region of memory is non-secure then at step 420, it is determined whether the access request is non secure (i.e. whether INPUT.NS is 1). If so, then there is a match between the memory region and the transaction type (both being non-secure) and the process proceeds to step 440 where the override is considered, as previously discussed. Otherwise, the process proceeds to step 430, which represents a mismatch between the memory region being accessed and the transaction type. Step 430 therefore determines whether NSCHECK is enabled. If so, then at step 435, this causes a fault to be generated as previously discussed. If not, then the transaction proceeds as the lowest security level (i.e. non-secure), and step 440 determines whether the transaction should be forced to being secure (i.e. whether NSA is 0) as previously discussed.

Accordingly, it is demonstrated how the protection circuitry 205 determines which of the storage circuitries 150, 155 to access in dependence upon which memory region in the storage circuitry 220 is hit, the security indicator associated with that region (REGION[INPUT.ADDR].NS), the request type field (INPUT.NS) that indicates whether the input address is associated with a secure physical address or a non-secure physical address, the override flags 'SA' and 'NSA', and the configuration regions 210 (NSCHECK) that indicate what is to occur in the event of a mismatch between the request type field and the security indicator.

In this particular example, the 'direction' configuration value is set to 'least'. Consequently, when there is a mismatch in memory region type and request type at steps 425 and 430, if a fault is not generated then the transaction defaults to being non-secure. However, it will be appreciated that in other embodiments, the transaction could default to being secure (causing the process to flow to step 450 from 425 and 430 if no exception is thrown) or the decision of steps 425 and 430 could be removed entirely and a fault could always be generated at step 435 when a mismatch occurs at steps 415 and 420, with the transaction being abandoned.

Figure 5:
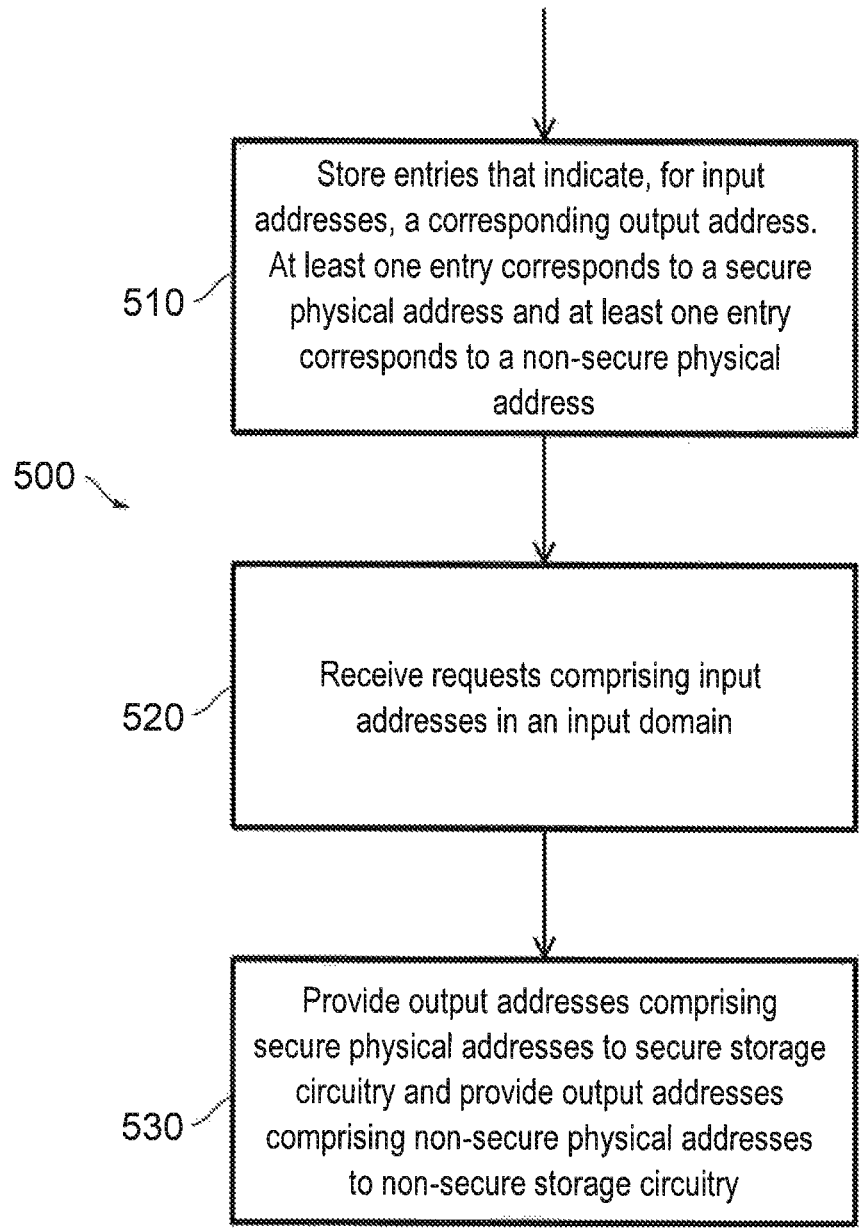
FIG. 5 illustrates a method in accordance with some embodiments.

FIG. 5 illustrates a method in accordance with some embodiments. The method is illustrated in the form of a flow chart 500. At a step 510, entries are stored in storage circuitry that indicates, for input addresses, a corresponding output address. This could be provided as a conversion between the input address and the output address or the input address and the output address could be the same (e.g. in the case of an MPU). At least one of the entries corresponds to a secure physical address in secure storage circuitry and at least one entry corresponds to a non-secure physical address in non-secure storage circuitry. At a step 520, requests comprising input addresses in an input domain are received. The input domain could, for instance, be an intermediate physical address domain or could be a physical address domain depending on the nature of the apparatus. At a step 530, output addresses are provided in dependence upon the input addresses. The output addresses include secure physical addresses to the secure storage circuitry and non-secure physical addresses to non-secure storage circuitry.

Accordingly it is demonstrated how apparatus is provided that can control access to both secure storage circuitry and non-secure storage circuitry as part of an access process.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
input circuitry configured to receive requests comprising input addresses in an input domain;
output circuitry configured to provide output addresses, wherein the output addresses comprise secure physical addresses to secure storage circuitry and non-secure physical addresses to non-secure storage circuitry;
lookup circuitry configured to store a plurality of entries that indicate, for each of the input addresses, a corresponding one of the output addresses, wherein at least one of the entries relates to one of the secure physical addresses, and at least one of the entries relates to one of the non-secure physical addresses, wherein each entry in the entries comprises a security indicator to indicate whether the entry is a secure physical addresses or whether the entry is a non-secure physical addresses;
protection circuitry configured to control access to the secure storage circuitry and the non-secure storage circuitry in dependence on the security indicator; and
storage circuitry configured to store one or more settings to perform one or more error actions to control behavior of the protection circuitry when the request type field and the security indicator are other than the same,
wherein each request in the requests comprises a request type field to indicate whether an input address in that request is associated with one of the secure physical addresses or one of the non-secure physical addresses.

2. The apparatus according to claim 1, wherein the apparatus is a Memory Protection Unit.

3. The apparatus according to claim 1, wherein
the input address is an Intermediate Physical Address; and,
the entries comprise mappings from the input addresses to the secure physical addresses and from the input addresses to the non-secure physical addresses.

4. The apparatus according to claim 1, wherein the protection circuitry is adapted to control access to the secure storage circuitry and the non-secure storage circuitry in dependence on the security indicator and the request type field.

5. The apparatus according to claim 1, wherein when the request type field and the security indicator match, the protection circuitry permits the request to proceed.

6. The apparatus according to claim 1, wherein
when the request type field indicates the input address is associated with the non-secure storage circuitry and the security indicator indicates the input address is associated with the non-secure circuitry, the protection circuitry is configured to forwards the request to the non-storage secure storage circuitry.

7. The apparatus according to claim 1, wherein
when the request type field indicates the input address is associated with the secure storage circuitry and the security indicator indicates the input address is associated with the secure storage circuitry, the protection circuitry is configured to forwards the request to the secure storage circuitry.

8. The apparatus according to claim 1, wherein
when the request type field indicates the input address is associated with the secure storage circuitry and the security indicator indicates the input address is associated with the non-secure storage circuitry, the protection circuitry is configured to performs the error actions; and,
when the request type field indicates the input address is associated with the non-secure storage circuitry and the security indicator indicates the input address is associated with the secure storage circuitry, the protection circuitry is configured to perform the error actions.

9. The apparatus according to claim 1, wherein
the error actions comprise forwarding the request to the least secure of the storage circuitries indicated by the request type field and the security indicator.

10. The apparatus according to claim 1, wherein
the error actions comprise forwarding the request to the most secure of the storage circuitries indicated by the request type field and the security indicator.

11. The apparatus according to claim 1, wherein
the error actions comprise generating a fault.

12. The apparatus according to claim 11, wherein
the fault corresponds with an invalid page fault.

13. The apparatus according to claim 1, comprising:
the request comprises an override field to indicate whether the protection circuitry should be overridden.

14. The apparatus according to claim 13, wherein
the override field is adapted to indicate whether the request should be forwarded to the secure storage circuitry or the non-secure circuitry, irrespective of the security indicator.

15. A method comprising:
receiving requests comprising input addresses in an input domain;
providing output addresses, wherein the output addresses comprise secure physical addresses to secure storage circuitry and non-secure physical addresses to non-secure storage circuitry; and,
storing a plurality of entries that indicate, for each of the input addresses, a corresponding one of the output addresses, wherein at least one of the entries relates to one of the secure physical addresses, and at least one of the entries relates to one of the non-secure physical addresses, wherein each entry in the entries comprises a security indicator to indicate whether the entry is a secure physical addresses or whether the entry is a non-secure physical addresses;
controlling access to the secure storage circuitry and the non-secure storage circuitry in dependence on the security indicator; and
storing one or more settings to perform one or more error actions when the request type field and the security indicator are other than the same,
wherein each request in the requests comprises a request type field to indicate whether an input address in that request is associated with one of the secure physical addresses or one of the non-secure physical addresses.

16. An apparatus comprising:
means for receiving requests comprising input addresses in an input domain;
means for providing output addresses, wherein the output addresses comprise secure physical addresses to secure storage circuitry and non-secure physical addresses to non-secure storage circuitry; and,
means for storing a plurality of entries that indicate, for each of the input addresses, a corresponding one of the output addresses, wherein at least one of the entries relates to one of the secure physical addresses, and at least one of the entries relates to one of the non-secure physical addresses, wherein each entry in the entries comprises a security indicator to indicate whether the entry is a secure physical addresses or whether the entry is a non-secure physical addresses;
means for controlling access to the secure storage circuitry and the non-secure storage circuitry in dependence on the security indicator; and
means for storing one or more settings to perform one or more error actions when the request type field and the security indicator are other than the same,
wherein each request in the requests comprises a request type field to indicate whether an input address in that request is associated with one of the secure physical addresses or one of the non-secure physical addresses.

* * * * *